US006947835B2

(12) United States Patent
Kaplan et al.

(10) Patent No.: US 6,947,835 B2
(45) Date of Patent: Sep. 20, 2005

(54) METHOD FOR MONITORING CELLULAR COMMUNICATION, AND SYSTEM THEREFOR

(76) Inventors: Joseph Kaplan, 44 Ha'onia St., Rishon Le'Zion (IL), 75438; Ofer Avni, Gizo 1, Gizo (IL), 99745

( * ) Notice: Subject to any disclaimer, the term of this patent is extended or adjusted under 35 U.S.C. 154(b) by 93 days.

(21) Appl. No.: 10/311,816

(22) PCT Filed: Jun. 28, 2001

(86) PCT No.: PCT/IL01/00588

§ 371 (c)(1),
(2), (4) Date: Dec. 19, 2002

(87) PCT Pub. No.: WO02/03350

PCT Pub. Date: Jan. 10, 2002

(65) Prior Publication Data

US 2003/0100317 A1 May 29, 2003

(30) Foreign Application Priority Data

Jul. 2, 2000 (IL) ................................................ 137123

(51) Int. Cl.⁷ .............................. H04Q 7/20; H04B 7/00
(52) U.S. Cl. ......................... 701/207; 701/25; 701/200; 455/436; 455/437; 370/328
(58) Field of Search ........................... 701/207, 25, 32, 701/200, 213, 214; 455/436, 437, 439; 370/328

(56) References Cited

U.S. PATENT DOCUMENTS 5,432,841 A * 7/1995 Rimer ......................... 455/457
5,465,289 A   11/1995 Kennedy, Jr.
5,519,762 A * 5/1996 Bartlett ....................... 455/574
5,740,535 A   4/1998 Rune
5,842,125 A * 11/1998 Modzelesky et al. ..... 455/426.1
6,381,463 B1 * 4/2002 Tu et al. ................... 455/456.5

FOREIGN PATENT DOCUMENTS

| EP | 0 763 807 A1 | 3/1997 |
| GB | 2 335 570 A | 9/1999 |
| WO | WO 98/12683 A1 | 3/1998 |
| WO | WO 99/44183 A1 | 9/1999 |

* cited by examiner

Primary Examiner—Thomas G. Black
Assistant Examiner—Arthur D. Donnelly
(74) Attorney, Agent, or Firm—Lava Group by Smith & Frohwein, LLC; Gregory Scott Smith (57) ABSTRACT

A system and method that continuously extracts traffic load and speed on roads within the coverage area of a cellular network. The data is extracted directly from the higher level of communications in a cellular network without using any external sensors. The cellular data used by the system includes cell handover sequences as the major input. The method consists of a learn phase in which a vehicle with a location device (say GPS system) travels across the covered routes and collects the cellular data and location data in parallel. In the continuous data collection stage the cellular data is processed and correlated to the data collected in the learn phase to yield the route and exact location of the vehicle on it. Each such two locations yield the travel distance and time, and thus the driving speed in this route section. This procedure is performed continuously across the covered area to yield the traffic load and speed.

14 Claims, 10 Drawing Sheets

FIGURE 1

| ROUTE SECTION | CELL TRIO |
|---|---|
| R1 | A2, A1, B1 |
| R2 | A2, A1, A2 |
| R3 | A3, A2, A1 |
| R4 | A1, A2, A3 |
| R5 | B1, A1, A2 |
| R6 | A2, A3, B3 |
| R7 | B2, B1, A1 |
| R8 | B1, B2, B3 |
| R9 | B3, B2, B1 |
| R10 | A1, B1, B2 |
| R11 | A1, B1, A1 |
| R12 | B2, B1, C1 |
| R13 | A1, B1, C1 |
| R14 | A3, B3, B2 |
| R15 | C1, B1, B2 |
| R16 | C2, B2, B3 |
| R17 | C2, B2, B1 |
| R18 | C1, B1, C1 |
| R19 | C3, C2, B2 |
| R20 | C1, C2, B2 |
| R21 | C1, C2, C3 |
| R22 | C3, C2, C1 |
| R23 | C2, C1, B1 |
| R24 | C1, B1, A1 |
| R25 | B1, C1, C2 |
| R26 | B1, C1, B1 |
| R27 | C1, C2, C3 |
| R28 | C1, C2, B2 |
| R29 | C1, C2, C3 |
| R30 | C1, C2, C1 |

FIGURE 2

| CELL TRIO | ROUTE SECTION |
|---|---|
| A1, A2, A3 | R4 |
| A1, B1, A1 | R11 |
| A1, B1, B2 | R10 |
| A1, B1, C1 | R13 |
| A2, A1, A2 | R2 |
| A2, A1, B1 | R1 |
| A2, A3, B3 | R6 |
| A3, A2, A1 | R3 |
| A3, B3, B2 | R14 |
| B1, A1, A2 | R5 |
| B1, B2, B3 | R8 |
| B1, C1, B1 | R26 |
| B1, C1, C2 | R25 |
| B2, B1, A1 | R7 |
| B2, B1, C1 | R12 |
| B3, B2, B1 | R9 |
| C1, B1, A1 | R24 |
| C1, B1, B2 | R15 |
| C1, B1, C1 | R18 |
| C1, C2, B2 | R20, R28 |
| C1, C2, C1 | R30 |
| C1, C2, C3 | R21, R27, R29 |
| C2, B2, B1 | R17 |
| C2, B2, B3 | R16 |
| C2, C1, B1 | R23 |
| C3, C2, B2 | R19 |
| C3, C2, C1 | R22 |

FIGURE 3

| Route Section | Continuous Sections |
|---|---|
| R1 | R10, R11, R13 |
| R2 | R4 |
| R3 | R1, R2 |
| R4 | R6 |
| R5 | R6 |
| R6 | R14 |
| R7 | R5 |
| R8 | |
| R9 | R7, R12 |
| R10 | R8 |
| R11 | R5 |
| R12 | R25, R26 |
| R13 | R25, R26 |
| R14 | R9 |
| R15 | R8 |
| R16 | |
| R17 | R7, R12 |
| R18 | R25, R26 |
| R19 | R16, R17 |
| R20 | R16, R17 |
| R21 | |
| R22 | R23 |
| R23 | R15, R18, R24 |
| R24 | R5 |
| R25 | R20, R21 |
| R26 | R15, R18, R24 |
| R27 | |
| R28 | R16, R17 |
| R29 | |
| R30 | R23 |

FIGURE 4

HANDOVER TIMING TABLE

| HANDOVER | TIME |
|---|---|
| A1, A2 | 8:00 |
| A2, A3 | 8:06 |
| A3, B3 | 8:13 |
| B3, B2 | 8:18 |

CELL TRIO TIMING AND ROUTE TABLE

| Cell Trio | Time | Possible Routes | Continuous Routes | Verified Routes |
|---|---|---|---|---|
| A1, A2, A3 | 0:06 | R4 | R4 | R4 |
| A2, A3, B3 | 0:07 | R6 | R6 | R6 |
| A3, B3, B2 | 0:05 | R9 | R14 | R14 |

FIGURE 5

HANDOVER TIMING TABLE

| HANDOVER | TIME |
|---|---|
| A1, B1 | 8:00 |
| B1, C1 | 8:05 |
| C1, C2 | 8:08 |
| C2, C3 | 8:12 |

CELL TRIO TIMING AND ROUTE TABLE

| CELL TRIO | TIME | POSSIBLE ROUTES | CONTINUOUS ROUTES |
|---|---|---|---|
| A1, B1, C1 | 0:05 | R13 | R13 |
| B1, C1, C2 | 0:03 | R25 | R25 |
| C1, C2, C3 | 0:04 | R21, R27, R29 | R21 |

FIGURE 6

HANDOVER TIMING TABLE

| HANDOVER | TIME |
|---|---|
| C1, C2 | 8:08 |
| C2, B2 | 8:13 |
| B2, B1 | 8:17 |
| B1, A1 | 8:20 |

CELL TRIO TIMING AND ROUTE TABLE

| CELL TRIO | TIME | POSSIBLE ROUTES | CONTINUOUS ROUTES | VERIFIED ROUTES |
|---|---|---|---|---|
| C1, C2, B2 | 0:05 | R20, R28 | R20, R28 | |
| C2, B2, B1 | 0:04 | R17 | R17 | R17 |
| B2, B1, A1 | 0:03 | R7 | R7 | R7 |

| Hour/Route | 00:00 - 00:15 | 00:15 - 00:30 | ... | 08:00 - 08:15 | 08:15 - 08:30 | ... | 12:30 - 12:45 | 12:45 - 13:00 | ... | 23:30 - 23:45 | 23:45 - 24:00 |
|---|---|---|---|---|---|---|---|---|---|---|---|
| R1 | 3 | 3 | ... | 19 | 16 | ... | 7 | 8 | ... | 4 | 3 |
| R2 | 5 | 4 | ... | 22 | 20 | ... | 10 | 11 | ... | 6 | 5 |
| . | | | | . | | | . | | | . | |
| R15 | 2 | 2 | ... | 12 | 10 | ... | 6 | 6 | ... | 3 | 2 |
| R16 | 4 | 5 | ... | 19 | 21 | ... | 16 | 17 | ... | 4 | 4 |
| . | | | | . | | | . | | | . | |
| R29 | 6 | 4 | ... | 12 | 11 | ... | 14 | 15 | ... | 9 | 7 |
| R30 | 4 | 4 | ... | 15 | 17 | ... | 6 | 6 | ... | 4 | 4 |

A table showing the average travel time for all the route sections within the designated area for a specific day in 15 minutes intervals

METHOD FOR MONITORING CELLULAR COMMUNICATION, AND SYSTEM THEREFOR

FIELD

This invention relates generally to traffic load monitoring, and in particular to determining the location and speed of vehicles carrying mobile phones using the cellular phone system.

BACKGROUND

Real time traffic loads detection and traffic speed measurement in specific routes is an urgent and important need in the modern urban areas. Statistical data about traffic loads in different time frames is a valuable asset for municipal planning authorities as well as commercial companies (road services, fleet companies etc.)

Until now these needs are fulfilled only partially, not in real time and in a very costly manner: Airplanes in peak hours, Cameras at key locations and (inaccurate) reports of driver's experience are used to generate partial, close to real time traffic data. Counters periodically located across the road in specific locations are used to generate local and partial statistical traffic data.

These inaccurate, costly methods are being used because until the last years there were no means to accurately inexpensively locate vehicles from remote. Lately two such mechanisms were introduced:

1. The GPS system that enables accurate detection of vehicles carrying GPS location detectors, of course a communication device is required to transmit the location data to a central location for analysis. In addition since the vehicle is identified this requires the owners consent. The GPS system is being used to some extent in theft detection/emergency services applications.
2. The cellular mobile systems with an exponentially growing installed base supply location information. Some companies have explored the option to extract traffic information by sending location data from cellular phones to an analysis center. Due to the quantities of calls or data-links that are required in order to receive a complete traffic picture, this method is not relevant to cellular operators, and their systems are likely to collapse if incorporated in such a system.

A cellular network consists of the following elements:

1. Cellular switches (typically controls 4–8 base station controllers)
2. Base station controllers (typically controls 32–64 base stations)
3. Base stations (where the cellular antennas are located)
4. Mobile units (cellular phones).

The first 3 elements are connected mostly by physical lines while the connection to the mobile unit is achieved through the air interface.

The network includes voice/data channels and forward/backward control channels that synchronize the network operation.

When a mobile unit moves across an area, reports of the signal strength from several base station is sent periodically over the control channels.

The signal level of the currently serving base station is monitored continuously and when it decays, a handover (also known as handoff) occurs that transfers control to another base station.

While the voice/data information goes all the way from the mobile unit to the cellular switch, the information that flows on the control channels does not always reach the cellular switch. For example signal strength information reaches the base station controller only, while handover information usually reaches the cellular switch.

Several methods are known in prior art that teach location detection or traffic speed monitoring based on cellular information.

U.S. Pat. No. 5,602,903 issued to LeBlanc et al and assigned to US West Technologies teaches a method of mapping cells boundaries based on RF measurements as polygons. In order to locate a mobile unit, the polygons for all base stations per it's location are intersected to yield the bounding of the polygon area that describes the position of the mobile unit in term of a minimum and maximum error estimate. This method is inaccurate in rural areas because of the large cells and will provide erroneous positions in urban areas due to the frequent radiation blocking and reflecting elements.

U.S. Pat. No. 5,657,487 issued to Doner and assigned to Airnet Communications teaches a method of mapping an area with vectors of cellular signal strength in a certain point from several base stations and then, when a car passes through, such mapping can determine on which road this car was traveling. Since this method is based on signal strength measurements that are performed periodically, it will get conflicting measurements in case of sharp signal changes within several meters range due to RF radiation blocking/reflecting elements. Actually this method teaches how to filter such changes and ignore areas in which such changes occur (see detailed explanation within the description of the Doner invention). This makes it insufficient in dense urban areas where such sharp changes are common. Furthermore—a system that will collect the signal strength data from all the base stations will be very large, costly and unrealistic to implement.

U.S. Pat. No. 5,465,289 issued to Kennedy and assigned to E-systems teaches a method that uses dedicated traffic sensors (RF receivers) that monitor cellular communications within an area. When a vehicle passes through a cell the entry and exit time of the call are recorded and, knowing the length of the road within the cell, the vehicle speed is generated. This method requires a dense spread of dedicated RF receivers across the area. In addition it may work only in cases where just one road, without any junctions, passes through a cell, and thus it can't be used for urban areas, nor for junctions within a cell.

The methods described in the prior art detailed above are insufficient for high accuracy traffic speed monitoring in urban areas. They do not supply solutions to the RF radiation blocking and reflecting elements within urban areas that have a very strong influence on handovers and signal strength sharp changes when driving through an urban area. They do not take into account the fact that within an urban area several road sections may pass through the same cell and screening algorithms applied on cell sequences are required to differentiate between those roads.

In addition the implementation of the methods mentioned above involve very high costs and many unnecessary elements. The 1st two are based on signal strength measurements. Although the manner in which they extract the information is not disclosed, it may be extracted either from the lines connecting the base stations to the base station controllers or from the air interface, which requires large quantities of expensive equipment (about 10–100 times more expensive and 50 times more components relative to monitoring the communication lines between the base station controllers and the switch). Trying to send all this information through the cellular network to the cellular switch is also not practical because it will load the cellular network in a manner that will cause it to collapse. The $3^{rd}$ prior art discloses an extremely expensive implementation requiring RF receivers spread over the covered area.

The current invention introduces a method to extract traffic information from any cellular network in every load stage possible, with minimal hardware elements and hence minimal system cost. This invention teaches a method to utilize the frequent and repeatable handovers caused by the radiation blocking and reflecting elements in urban areas in order to further increase the accuracy of the correlation between cars and the road they travel on, while minimizing and simplifying the system required for this, and thus provides a much better resolution needed for speed extraction in urban areas.

SUMMARY OF THE INVENTION

The current invention describes a system and method for measuring traffic load and speed based on monitoring and analyzing cellular communications. Accurate mobile unit location is derived from the cellular communications data in specific positions and timings. This data is analyzed to separate pedestrians, motorbikes and cars, and car data is further analyzed to derive the route the car drives through and the speed. Data is collected and analyzed for all routes continuously thus yielding real time traffic load and speed information as well as continuous and comprehensive statistical data.

DESCRIPTION OF THE INVENTION

The current invention derives vehicle location information from the data available on the cellular network. There are 3 main sources from which the data may be collected:

1. Mobile unit reports detailing the signal level from surrounding cells during calls. During a call the mobile unit periodically (every 30 seconds) reports the signal level for the surrounding cells, to be used by the network (the switch) as a basis for it's handover decisions. A single report may not indicate the exact location, since there may be several locations at which the signal level is the same. In addition signal levels may vary due to external factors. However, when several reports are matched against the possible routes a vehicle may take within a certain area, this can be turned into an accurate location accompanied by the exact timing.

This information is available to the base station controller as an integral part of each call, and can either be extracted from the base station controller or by intercepting the communication channel between the base stations and the switch. Since the mobile unit has this information, it can be sent as an SMS, using WAP or any other protocol to another phone for collection and analysis.

2. Cellular handover information during calls. Handover operation is performed each time a mobile unit, being engaged in a call, gets close to the edge of a cell or passes by a radiation blocking/reflecting element. The decrease in communication quality is identified by the cellular system and then the system transfers control of the communications line to another cell. The handover information, containing the old and new cell and the timing is available on the cellular communications control network. Since the cellular system handover decisions are deterministic and repeatable to a large extent this data can supply the accurate location of the mobile unit and the exact timing.

This information is available to the cellular switch as an integral part of each call, and can either be extracted from the cellular switch or by intercepting the communication channel between the base station controller and the switch. Since the mobile unit has this information, it can be sent as an SMS, using WAP or any other protocol to another phone for collection and analysis.

3. Location queries to mobiles not engaged in a call. A mobile not engaged in a call reports it's location (current cell) periodically (every hour). If additional information is required for this area, a query can be forwarded to this mobile unit to:

Send the signal level of the any combination of the surrounding cells. This data can be sent and used as specified in (1).

When the mobile is switching between cells, send the ID of the cell that was switched from and the cell that was switched to, without reporting signal level. This data can be sent and used as specified in (2).

The last procedure is loading the cellular system with heavy duty queries and messages, thus it will be conducted only when the cellular system is free of load, i.e. very little number of calls compared to the limitations of the cellular system.

Determination of Handover Locations and Signal Strength Along Routes (Learning)

The $1^{st}$ stage in the algorithm is the leaning stage. In this stage two databases are created: one containing all the handover locations for vehicles driving in any road and in any direction within a designated area, and the other containing all the reports detailing the signal strength for the cells across this area.

The learning process is carried out in the following manner: vehicles with synchronized GPS system, yielding continuously an accurate location and with operating cellular mobile unit travel across the designated area covering each road, in any driving direction and all possible turns. The handover information and the signal strength report information for these mobile units are gathered and matched with the accurate location to yield the accurate location for each handover report or signal strength report. These results are averaged for all the handover and signal strength reports to yield the average vehicle location when the handover takes place, or for each combination of signal strength.

Each entry in the Handover database contains a couple of cells (A and B) and the average handover location. The accurate location is kept in coordinates matching a map of the area, which is managed by a GIS (Geographic information system) software tool.

Each entry in the signal strength database contains several cells (up to 10) and for each cell it contains the average signal stength. In addition each entry contains the accurate location as specified above.

Figure 1:
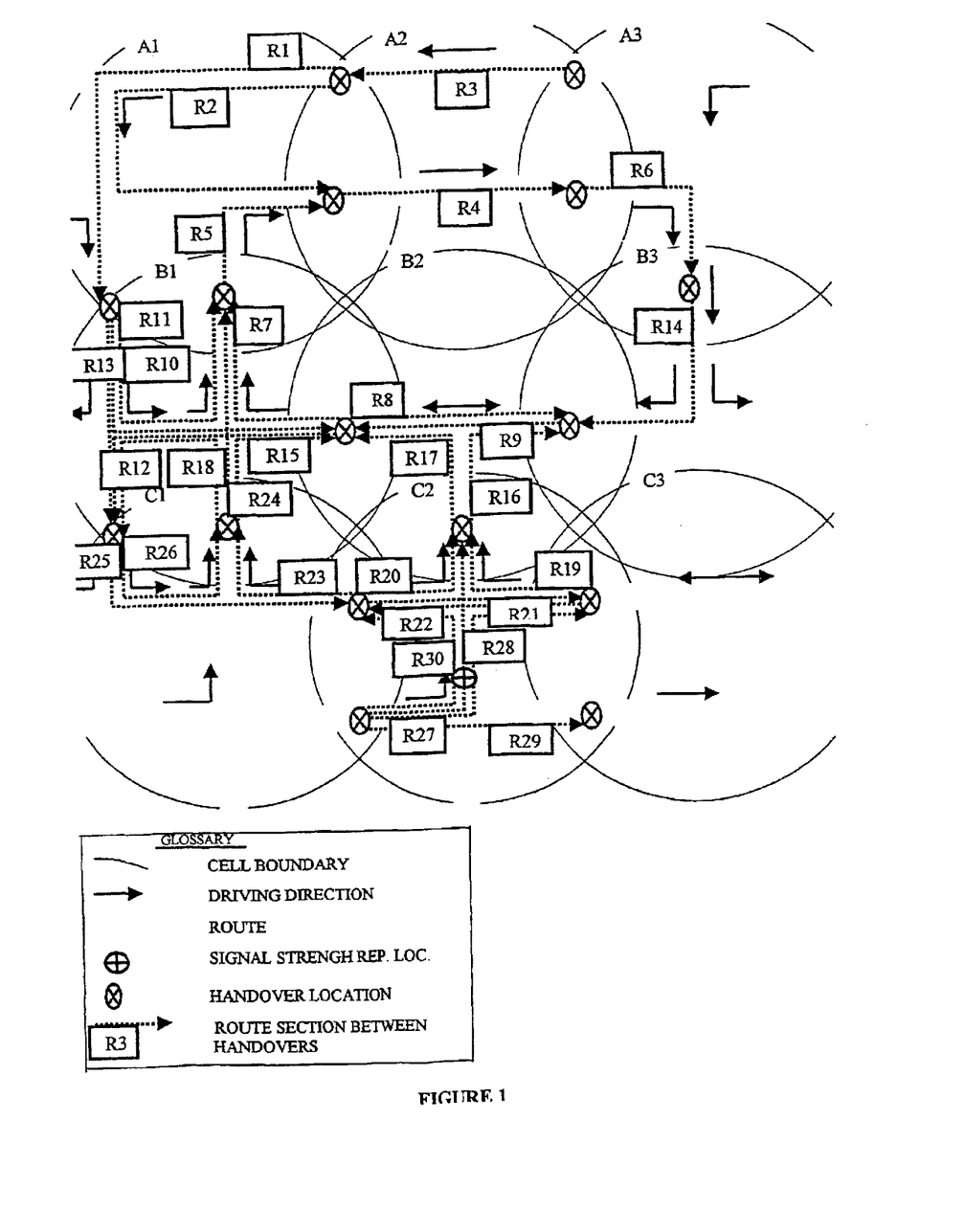
FIG. 1 shows a road map of a designated area including cellular coverage, handover and signal strength locations and route sections.

FIG. 1 shows a route map, including driving directions, covered by cells A1–C3 of a cellular network (which define the designated area). The handover locations and signal strength reports identified through the learning process are shown on the map as well.

Figure 9:
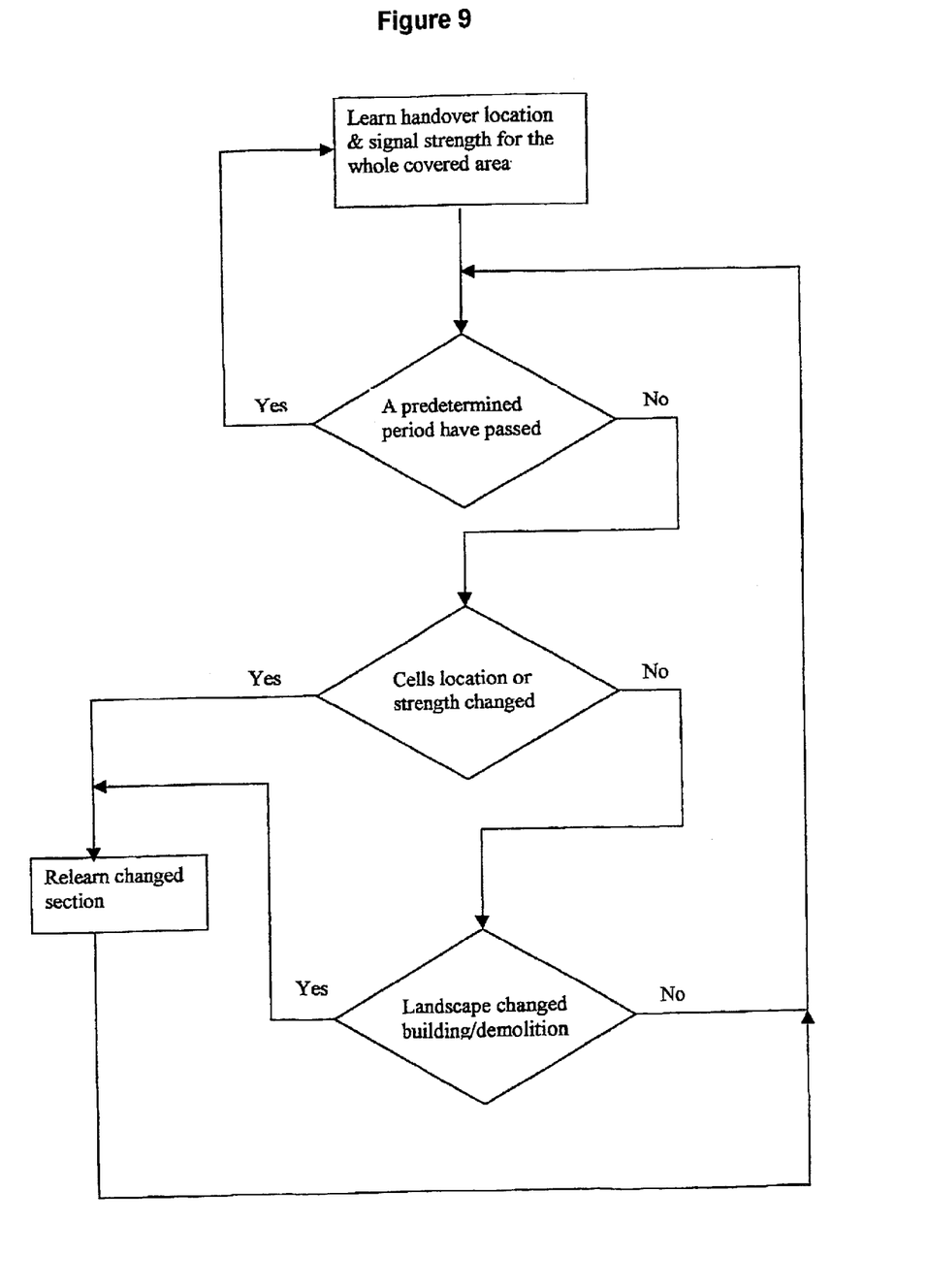
FIG. 9 shows the learning flow chart describing the timing and circumstances that require a full or partial learning of handover and signal strength location along routes within the designated area.

FIG. 9 shows the flow chart of the learning process as detailed in the next paragraph.

The database creation operation is repeated for the whole covered area or for specific subsections in any of the following instances:

1. Once every a predetermined period (for example every three month).
2. Whenever there is a change in cellular base stations deployment in a certain sub section.
3. Whenever a significant construction/demolition job is carried out in a sub area, or there is a change in traffic directions or turns in a sub area.

Figure 2:
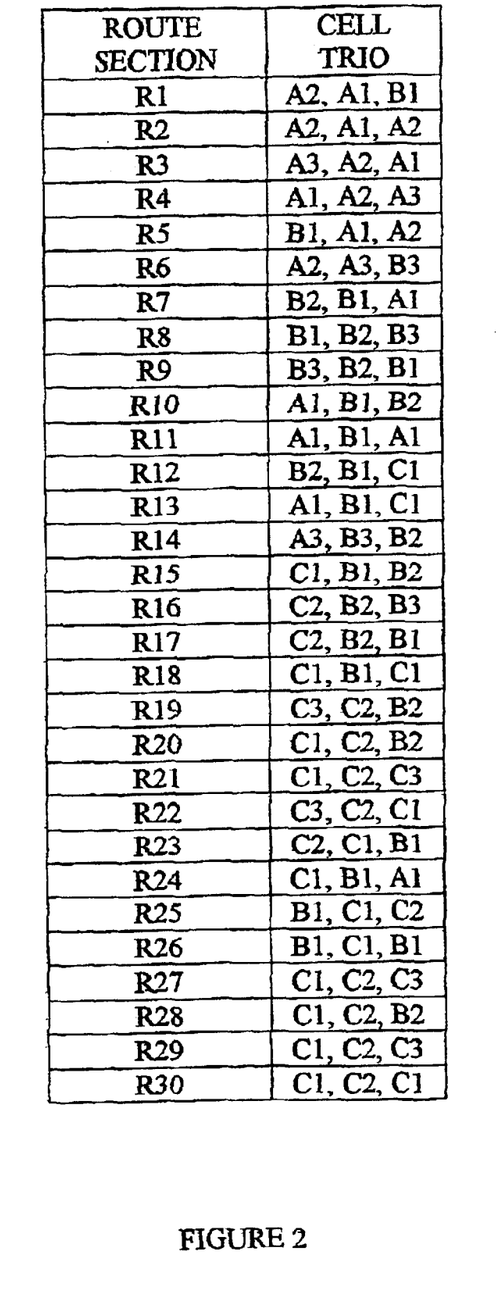
FIG. 2 shows the route section/cell triplet table for all the routes between two adjacent handover locations within the designated area.

Now the Route sections database is built by scanning all the possible routes in the map, dividing them into sections between each two adjacent handover locations. These route sections are shown on the map signed as R1–R30. Each route section has a direction shown on the map by an arrow (if driving in both directions is possible we will have two route sections, for example R8 and R9). A route/cell triplet table including a record for each route section is created in the database. This table is shown in FIG. 2. The key for the record is the route section ID. Each record contains the three cells A, B and C that represent two continuous handovers at the edges of the relevant route section. These three cells can be of the configuration A, B and A (for example the record for R2 contains the cell triplet A2, A1, A2). There may be several instances of a triplet A, B, C in the database (for example the cell triplet C1, C2, C3 stands for route sections R21, R27 and R29). For each such route section all the signal strength data is kept in the database as well as additional relevant data (distance, no. of traffic lights, no. of lanes etc.) that can effect the time to cross this section.

Figure 3:
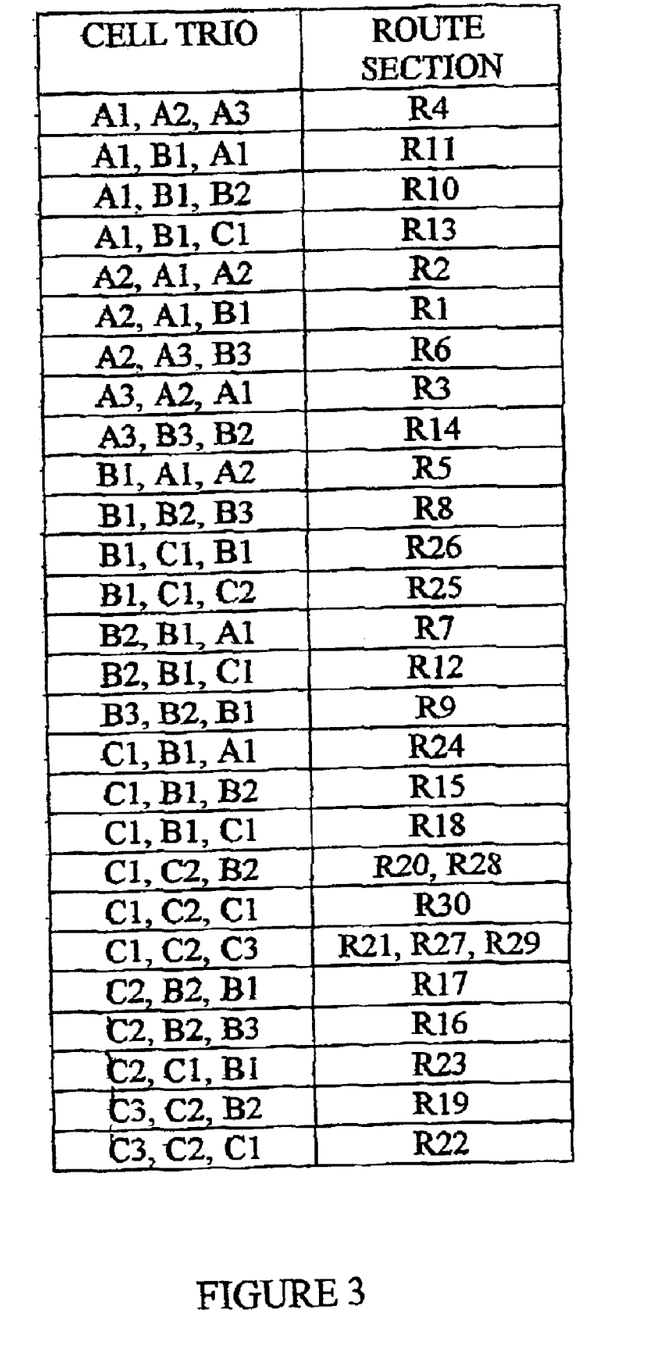
FIG. 3 shows the cell triplet/route section table derived from FIG. 2, there may be several route sections that may be allocated to the same cell triplet.

Another table, the cell triplet/routes table, is generated from the route/cell triplet table. This table is shown at FIG. 3. The key for each record in this table is the cell triplet, and each record contains all the route sections for this cell triplet. As can be seen in FIG. 3, there are several records which have more than one route section (for example the record with the key C1, C2, C3 has 3 route sections). This means that when we receive data for two continuous handovers creating a cell triplet there may be several routes represented by this cell triplet and we can't always tell which is the right one. We will see in the route identification section how we can some times overcome this problem.

Figure 4:
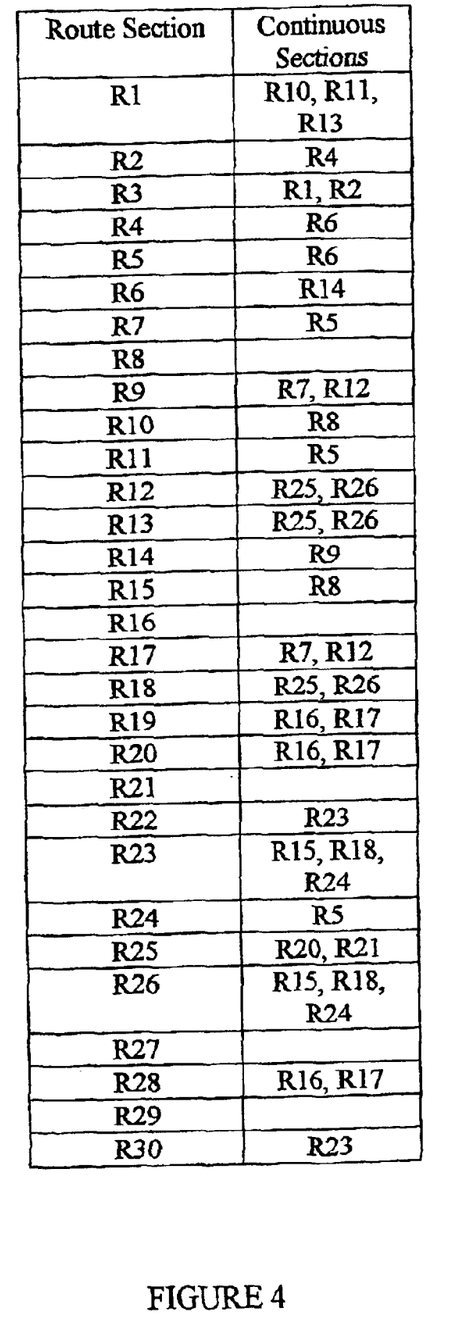
FIG. 4 shows the continuous route section table, for each route section all the route sections continuous to it are listed.

Another table generated in the database is the continuous route sections table. This table is shown in FIG. 4, and is generated by looking for continuous route sections on the GIS map. The key for each record in this table is a route section ID, and each records contains all the route sections that are continuous to this route section. When examining the table in FIG. 3 one can see there are route sections without a continuation (e.g. R8), some with one continuous route section (e.g. R2) and some with several continuous route sections (e.g. R1).

Route Identification

When a mobile phone is engaged in a call, all the handover data and signal strength data are collected by the system.

Figure 5:
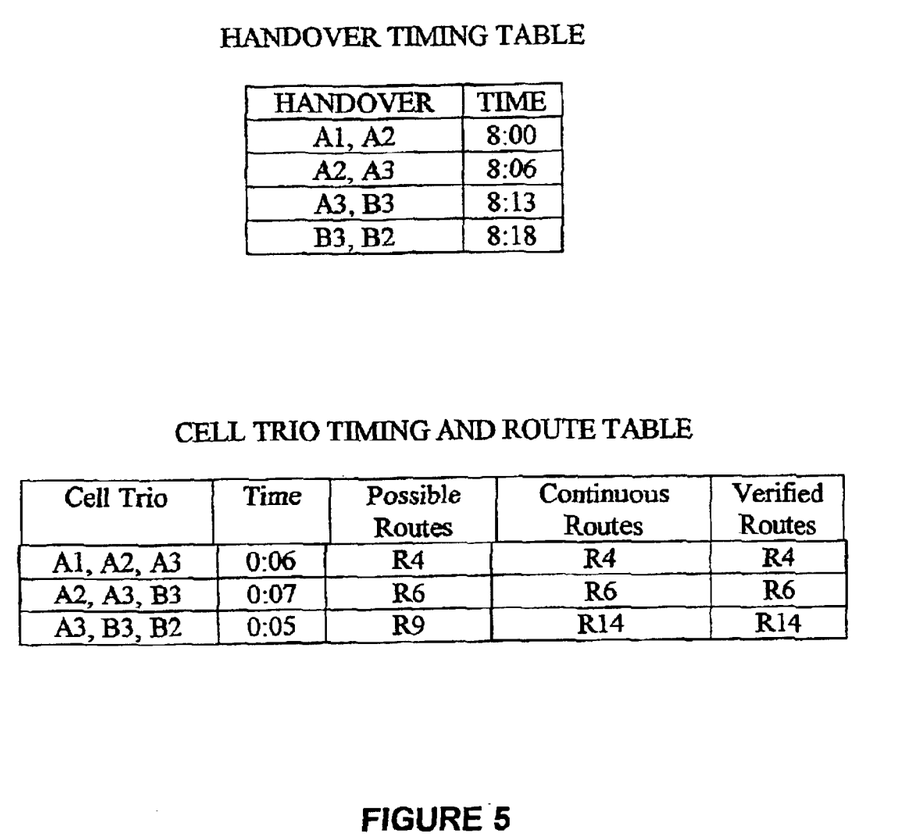
FIGS. 5–7 show the handover data collected for three vehicles and it's analysis to derive the time required to travel through the route sections involved at a specific time and date.
Figure 6:
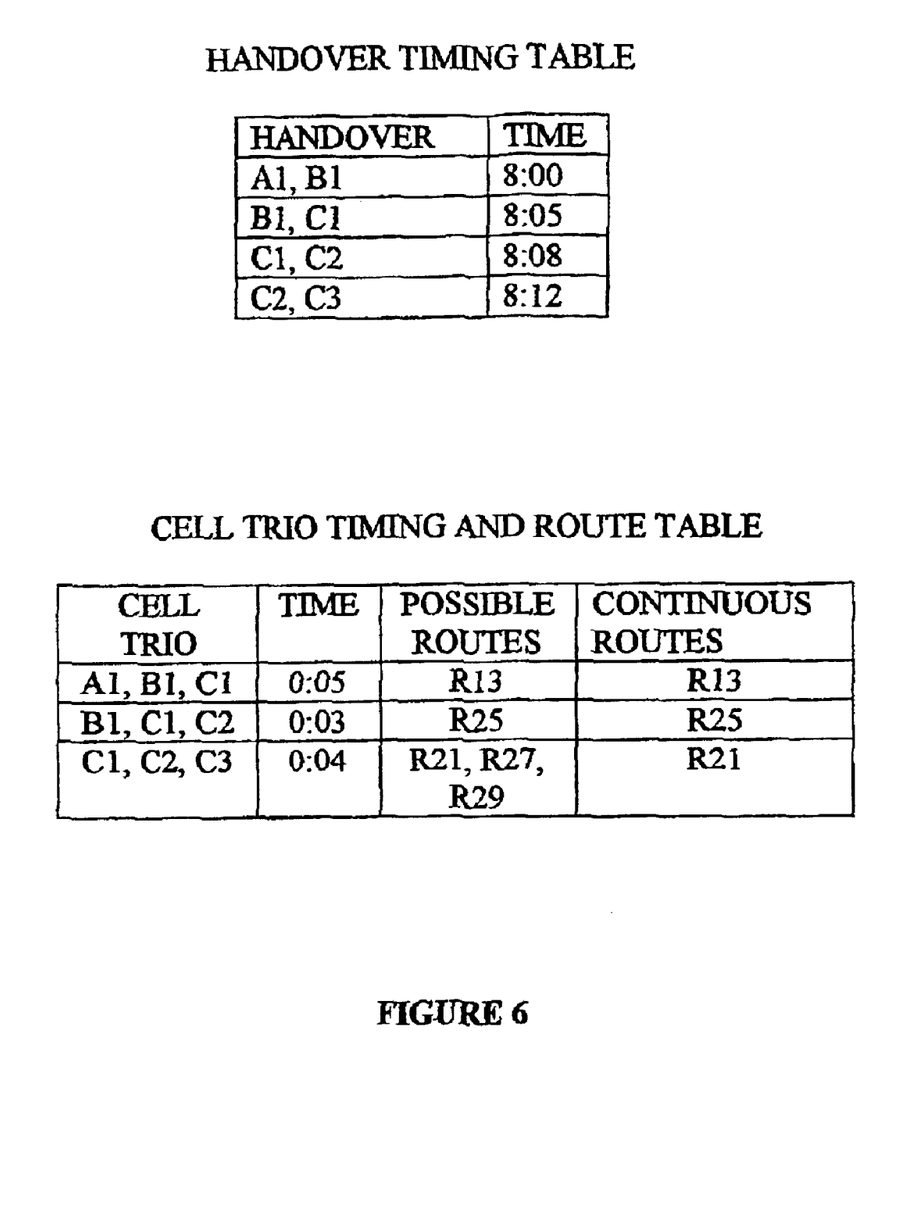
Figure 7:
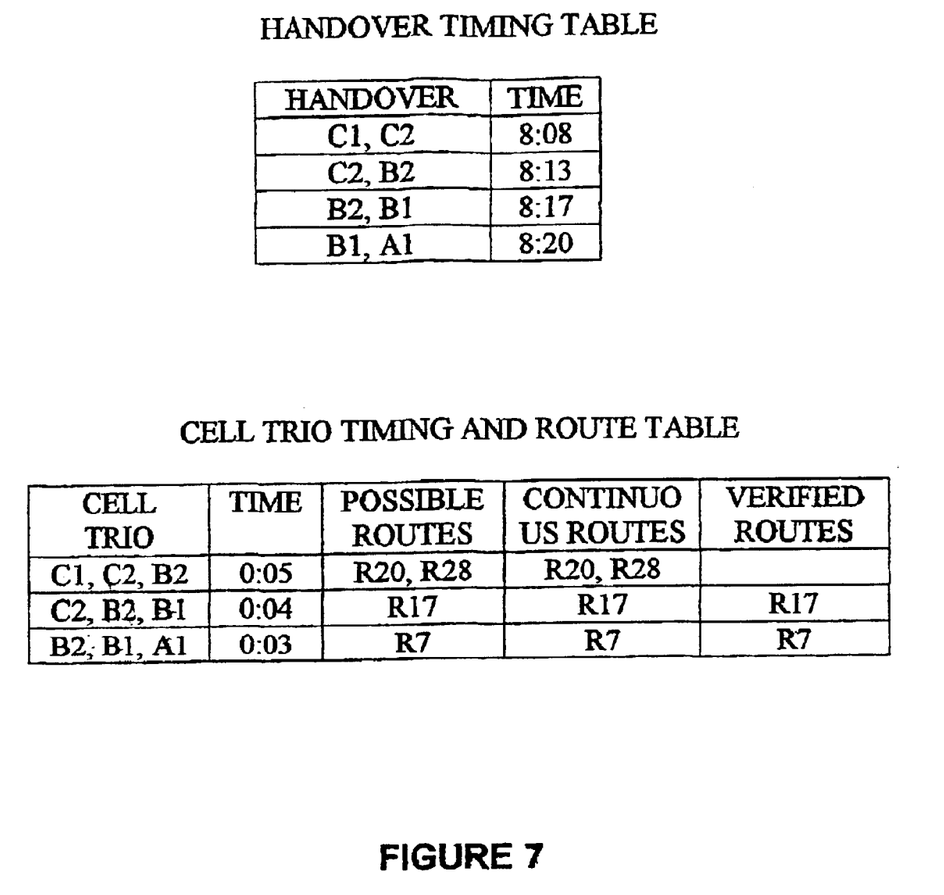
Figure 10:
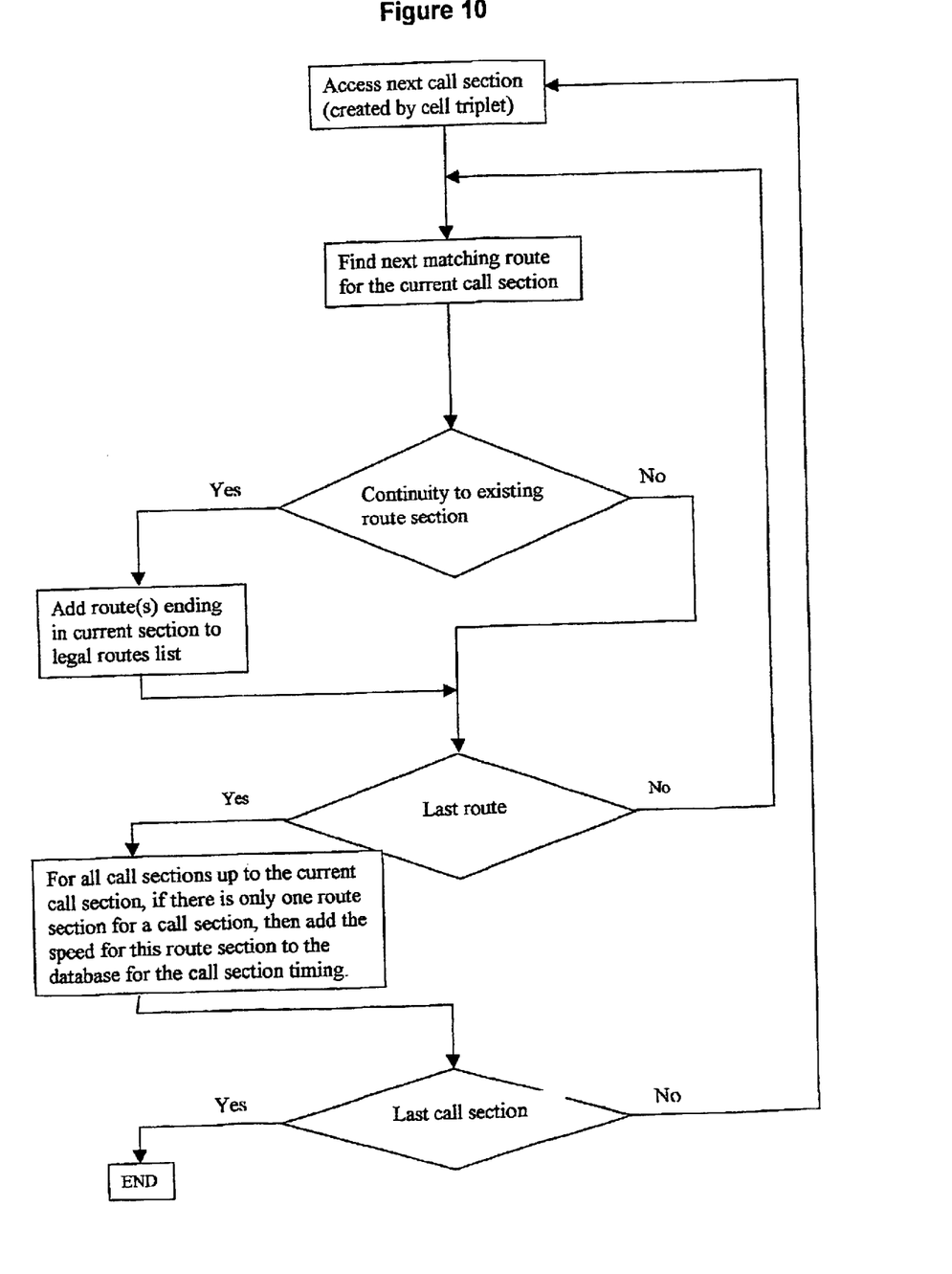
FIG. 10 shows the route identification flow chart describing the process of allocating a single route section to a cell triplet data collected during a cellular call.

The handover data collected for each vehicle and it's analysis are shown in three examples for three vehicles in FIGS. 5–7. The flow chart in FIG. 10 describes the route identification process.

For each handover the two cells involved in the handover and the handover time are reported, as shown on the handover timing table in FIGS. 5–7. Each two continuous handovers yield three cells A, B and C. The cell/route table in the database is scanned to yield all possible routes for this handover sequence, as shown in the cell triplet timing and route table in FIGS. 5–7.

In FIG. 5 one can see there is only one candidate for each route section, so we know exactly what was the route of vehicle 1 and how much time it needed to pass each route section.

If more than one route section exists than a screening process is applied by filtering route section for consecutive cell triplets (ABC, BCD) that do not create continuous route, using the continuous section table created in the learning process. This process is performed in a loop for all route sections. For example in FIG. 6 there are three candidates for the 3$^{rd}$ section—R21, R27 and R29. Using the continuous section table one can see that the continuous sections for the 2$^{nd}$ section—R25 are R20 and R21. As a result R27 and R29 are ruled out and R21 remains as the 3$^{rd}$ route section. So we know exactly the route and timing of vehicle no. 2. In this case the candidates for the current (last) route sections were filtered according to their continuity to the previous section. However there may be other cases when backward filtering might take place. This means that the current route section backward continuity might filter previous route sections. This is readily shown in the flow chart in FIG. 9.

If after the screening more than one route section exists, another screening process applied on the candidates by correlating the signal strength data across each route section to the ones received between the two handovers (A/B and B/C) if this data is available. For example, the 1$^{st}$ route section for vehicle 3 can be either R20 or R28. If we received a signal strength report located on route 28 (as shown on FIG. 1) we could rule out route 20, and know exactly the route and timing of vehicle 3.

If after the screening a single route section is found for a cell triplet, than this data is used to generate traffic status for the route section for the time in which the mobile call took place.

Before the database is updated data related to pedestrians on one hand and motorbikes/public transportation on the other hand is filtered.

Pedestrian data is filtered according to their speed that is slower than vehicles (e.g., a threshold of 6 Km. Per hour is set). In case of traffic congestion when the vehicles speed along a certain route section is slow, the speed of the same mobile unit along other route sections is used to verify whether the unit is used in a vehicle or by a pedestrian. In cases of doubt the data is not used.

Motorbikes and, sometimes, public transportation will travel at higher speeds in cases of traffic congestion, motorbikes because of their higher flexibility and public transportation wherever there are special lanes for public transportation (part of the GIS data).

These special vehicles will yield separate (higher) speed gausians and can be separated from cars according to the difference in gausians.

If the number of calls for a certain route section and a certain time interval is not sufficient in order to generate speed statistics, and the load on the cellular system enables it, queries are initiated (as in paragraph '3') in order to receive complete and more reliable information.

Continuous Data Collection

The route identification process is performed for all the data collected from the cell network, continuously over time, so that in any moment a full traffic picture of all route sections within the designated area is available.

The real time traffic picture is used for several commercial applications such as:

1. Real time alarms and warnings.
2. Best route finding for drivers, emergency services etc.
3. Update media providers such as radio stations.
4. Display data in a traffic site on the Internet.

The real time data is accumulated into a statistical database. This database includes statistical parameters of number of calls and speed on each section of each route per each time interval (say 15 minutes) of each day.

Based on the speed extraction in a route section, the statistical database and the average call ratio per no. of subscribers per time period, the load in this route section in different times can be readily derived.

Figure 8:
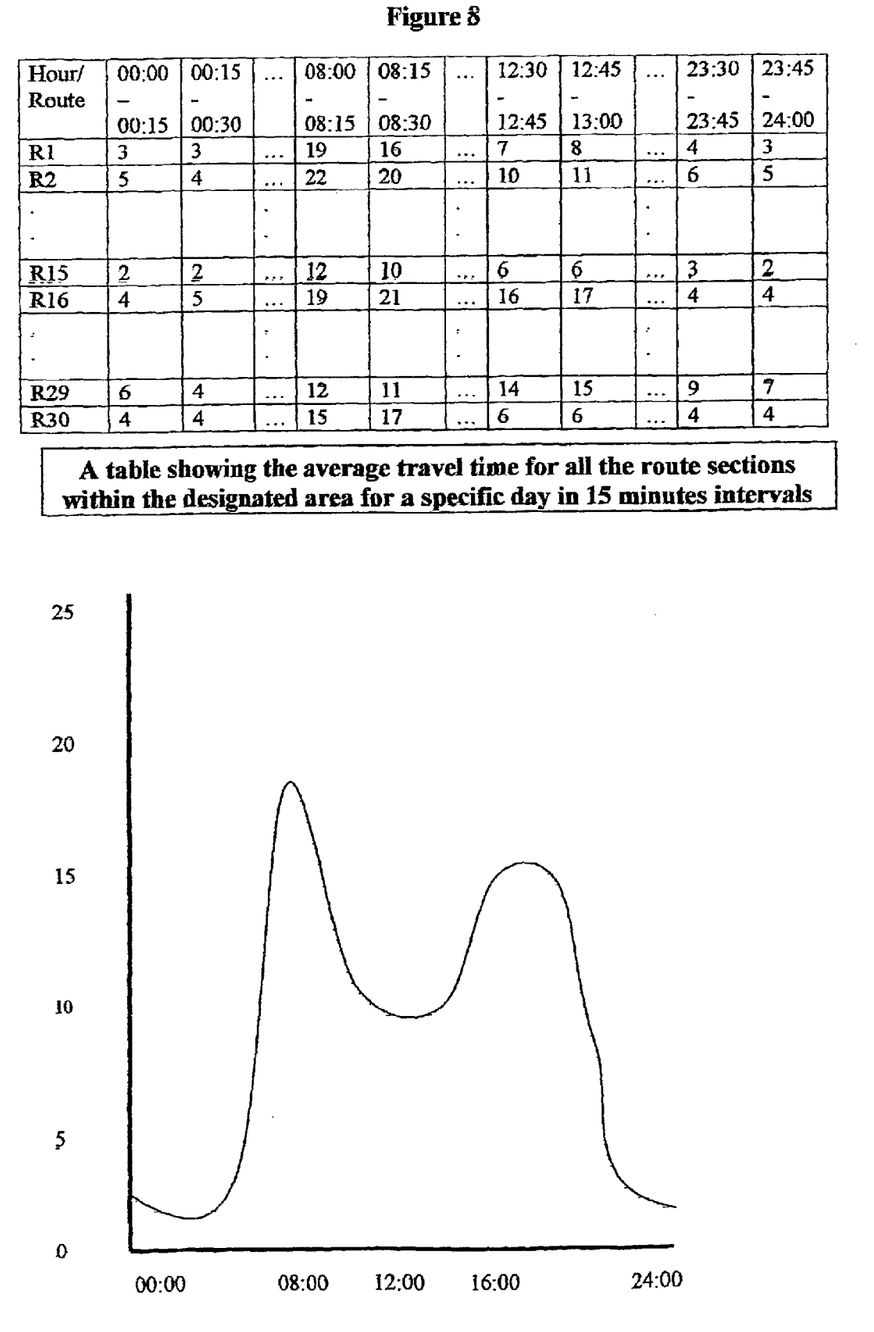
FIG. 8 shows the content of the statistical database and a typical report generated from it.

The contents of the statistical database for a certain day and a typical report generated from it are detailed in FIG. 8. The report gives the traffic load graph for the whole day for a certain route.

Other possible reports may show the load for the same time for a time period (a week a month, a year), around a special event (exhibition, sport event, accident) etc. Cross section reports are also available (for example comparison of different seasons, week days, holidays versus working days etc.)

The statistical database is correlated with real time data and used to extract traffic status if not enough data is available for a certain route section in a certain timing.

The statistical database is used for several commercial applications, such as:

1. Statistical information to municipal authorities for road construction planning, traffic light tuning etc.
2. Best path for multi stops route calculation for Fleets (delivery trucks, Fedex etc:). This route can be tuned in real time according to the real time traffic conditions.
3. Data about traffic loads for billing (e.g. billboards—per viewers and planning (e.g. billboards/shops/gas stations locations).
4. Law enforcement agencies (traffic jams, routes prone to speed violations etc.)

What is claimed is:

1. A method for correlating a car with the road on which it travels based on cellular communication, the method comprising the steps of:

creating a learnt database consisting of data extracted from the cellular system, correlated with the physical location of the cellular phone at the timing of each data extraction as a location reference, the location reference matching a map of the area; and conducting analysis of new data generated by any mobile unit from drives that do not contain location reference in conjunction with the learnt database to match a sequence of reports to a specific route.

2. The method according to claim 1 wherein the data is comprised of handover data.

3. The method according to claim 1 wherein the data extracted from the cellular network is comprised of:

handover data; and signal level data.

4. The method according to claim 1 wherein the analysis comprising the steps of:

conducting analysis of new handover sequences from new drives that do not contain location reference in conjuction with the learnt database and dividing the new handover sequences into two categories:

a) handover sequences that conform to a single route on the learnt database; and b) handover sequences that conform to more than one route in the learnt database;

for the handover sequences that conform to more than one route, indentifying the specific route by a screening processes; and assigning the route to the sequence of handovers.

5. The method according to claim 1 wherein the method is used for measuring time of driving for each route section based on cellular communication, further comprising the steps of:

correlating a series of handovers to a specific route as described in claim 1; and continuously extracting travel time for route sections, by using the timings of handovers and calculating time difference between them, and accumulating them in a database.

6. The method according to claim 1 wherein the method is used for generating a traffic speed database based on cellular communication, further comprising the steps of:

correlating a series of handovers to a specific route as described in claim 1;

continuously gathering traffic speed for route sections, by using the timings of handovers and the length of the route section between them, and accumulating them in a database.

7. The method according to claim 1 wherein a statistical database is created storing statistical information for each route section per time interval per day; said database enabling to derive the load on each route section in different times and including the following data for each time interval of each day:

number of calls;

speed; and time of travel.

8. The method according to claim 1 wherein information is derived from a mobile unit engaged in a call.

9. The method according to claim 1 wherein information is derived from a mobile unit not engaged in a call.

10. The method according to claim 1 wherein information is derived from a mobile unit not engaged in a call as a respond to queries.

11. A method for correlating a car with the road on which it travels based on cellular communication, the method comprising the steps of:

creating a learnt database consisting of data extracted from the cellular system, correlated with the physical location of the cellular phone at the timing of each data extraction as a location reference, the location reference matching a map of the area;

sending new data available in a mobile unit to another phone for collection and analysis; and conducting analysis of this data in conjunction the learnt database to match a sequence of reports of the new data to a specific route.

12. The method according to claim 11 wherein the information is sent from the mobile unit using WAP.

13. The method according to claim 11 wherein the information is sent from the mobile unit as an SMS.

14. A method for correlating a vehicle with the road on which it travels based on cellular communication, without the need to install hardware on base stations, the method comprising the steps of:

gathering data available on the cellular network and its location matching a map of the area, along routes within the designated area, and creating a learnt database; and conducting analysis of new data, generated by any mobile unit, from drives that do not contain location reference in conjunction with the learnt database to match a sequence of reports to a specific route.

* * * * *